No. 816,702.                    PATENTED APR. 3, 1906.
T. BELL.
RAILWAY BRAKE.
APPLICATION FILED JULY 29, 1905.
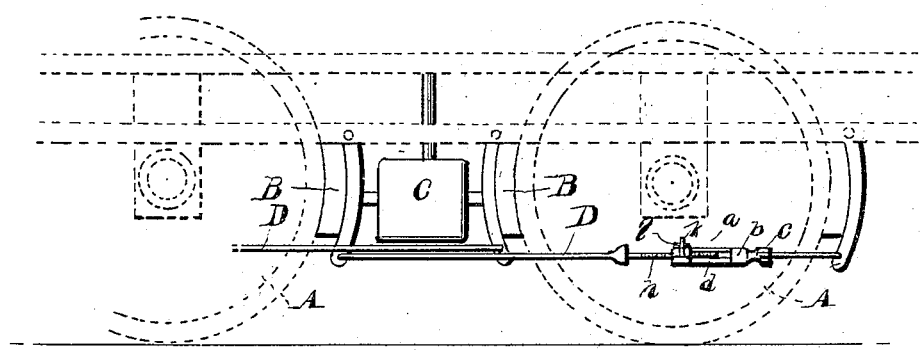
Fig. 1.
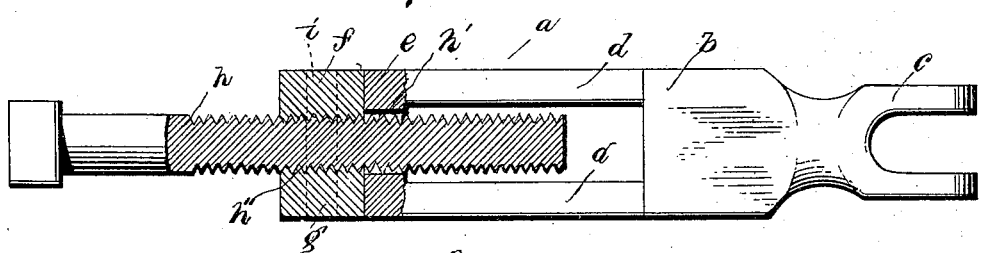
Fig. 2.
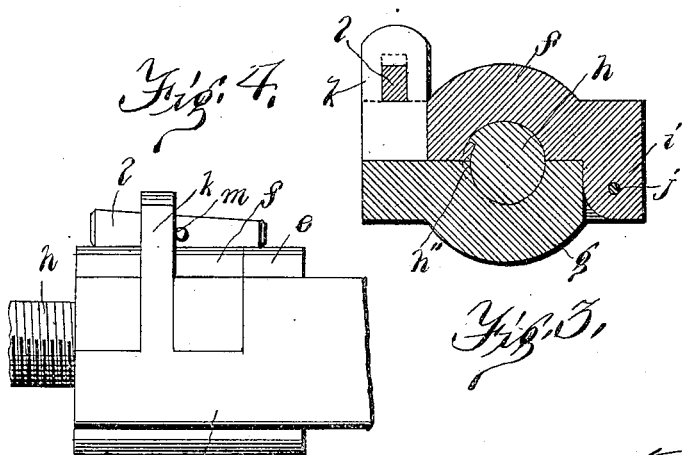
Witnesses
Forrest L. Smith
L. E. Barkley
Inventor
Thaddeus Bell
by Finus Appleman
Attorney

UNITED STATES PATENT OFFICE.

THADDEUS BELL, OF GRAFTON, WEST VIRGINIA.

RAILWAY-BRAKE.

No. 816,702.  Specification of Letters Patent.  Patented April 3, 1906.

Application filed July 29, 1905. Serial No. 271,766.

*To all whom it may concern:*

Be it known that I, THADDEUS BELL, a citizen of the United States of America, residing at Grafton, in the county of Taylor and State of West Virginia, have invented certain new and useful Improvements in Railway-Brakes, of which the following is a specification.

This invention relates to new and useful improvements in railway-brakes, and is intended more especially for that class of brakes employed on locomotives to brake the drivers.

An object of this invention is to provide novel means whereby the brake-rod may be easily adjusted to compensate for all wear on the brake-shoe or for any slack occurring in the rod.

Furthermore, an object of this invention is to provide a novel device of this character that will be simple in construction, efficient in practice, and comparatively inexpensive to produce and maintain.

With the foregoing and other objects in view the invention consists in the details of construction and in the arrangement and combination of parts to be hereinafter more fully set forth and claimed.

In describing the invention in detail reference will be had to the accompanying drawings, forming part of this specification, wherein like characters denote corresponding parts in the several views, in which—

Figure 1 is a view in elevation of a locomotive, showing the invention applied. Fig. 2 is a view, partly in elevation and partly in section, of the brake-rod. Fig. 3 is a cross-section of the device. Fig. 4 is an enlarged fragmentary view in elevation illustrating a detail of the invention.

In the drawings, $a$ indicates a yoke, having on one end the head $e$ and at the opposite end the section $b$, provided with the bifurcation $c$. The body $b$ and the head $e$ of the yoke are connected by the parallel arms $d$. The outer end of the head is reduced in thickness one-half, and the reduced portion has a semicircular recess $h''$, alined with the bore, in which the rod $h$ is rotatable. It is to be understood that the wall of the bore $h'$ is smooth and does not contact with the rod $h$. Hinged to the reduced portion of the head is a flap or section $f$, which is provided with a semicircular threaded recess registering with the recess of the head and is intended to receive the rod $h$, it being understood that the recesses are threaded to permit the adjustment of the rod. The hinged section $f$ is provided with a depending portion $i$, which fits in a recess in the edge of the head $e$ and is pivotally engaged by a pin $j$. The opposite portion of the hinged section is provided with an apertured extension, which receives a stud $k$ on the head. This stud is provided with a transverse aperture, through which passes a wedge or key $l$, the said wedge having a series of apertures to receive a cotter-pin $m$. By this arrangement the hinged cover or flap $f$ is held closed and in engagement with the rod $h$.

It has been found in practice that when it is necessary to adjust the brake-rod the threads of the rod and yoke become so corroded that turning of the rod is very difficult and at times impossible. By this invention such a difficulty is obviated, as it is but necessary to throw back the flap or hinged section of the head when the threaded portion of the head and rod may be easily disengaged, cleaned, or repaired, and adjusted without the loss of parts or labor of drilling out the screw.

In practice the invention illustrated is positioned between the brake-shoe and the brake-operating mechanism and may be employed on any form of brake, although it is especially intended for those brakes used for driving-wheels of locomotives.

Having thus fully described my invention, what I claim as new, and desire to secure by Letters Patent, is—

1. In combination, a yoke having a head, a portion of the head being reduced, a flap hinged to the reduced portion of the head, an apertured extension carried by the flap, a stud on the head engaged by the apertured extension of the flap, and means for holding the apertured extension in engagement with the stud.

2. In combination, a yoke having a head, a portion of the head being reduced, a flap hinged to the reduced portion of the head, an apertured extension carried by the flap, a stud on the head engaged by the apertured extension of the flap, said stud being provided with an aperture, and a wedge adapted to engage the aperture of the stud to hold the apertured extension of the flap in engagement with the stud.

3. In combination, a yoke having a head, a portion of the head being reduced, a flap hinged to the reduced portion of the head, an apertured extension carried by the flap, a stud on the head engaged by the apertured extension of the flap, said stud being provided with an aperture, a wedge adapted to engage the aperture of the stud to hold the apertured extension of the flap in engagement with the stud, and means carried by the wedge engaging the stud to hold the said wedge against displacement.

4. In combination, a yoke having a head provided with a smooth bore, a portion of the head being reduced, the reduced portion of the head being provided with a threaded recess coinciding with the bore of the head, a flap pivoted to the reduced portion of the head, said flap being provided with a threaded recess registering with the recess of the reduced portion of the head when in a closed position, means for holding the flap in a closed position, and a rod having a threaded portion adapted to be engaged by the threads of the reduced portion of the head and its flap.

In testimony whereof I affix my signature, in the presence of two witnesses, this 19th day of July, 1905.

THADDEUS BELL.

Witnesses:
W. E. CLAYTON
A. A. HOLT.